Sept. 15, 1936.  E. A. THOMPSON  2,054,685

SHOCK ABSORBER

Filed April 15, 1932

Inventor
Earl A. Thompson

By
Spencer, Hardman and Fehr
Attorneys

Patented Sept. 15, 1936

2,054,685

UNITED STATES PATENT OFFICE 2,054,685

SHOCK ABSORBER

Earl A. Thompson, Birmingham, Mich., assignor, by mesne assignments, to General Motors Corporation, Detroit, Mich., a corporation of Delaware Application April 15, 1932, Serial No. 605,437

4 Claims. (Cl. 188—88)

This invention relates to improvements in hydraulic shock absorbers.

It is among the objects of the present invention to provide a shock absorber having fluid flow control devices which are adjustable from outside the shock absorber whereby the characteristics of the shock absorber may be varied as desired.

Further objects and advantages of the present invention will be apparent from the following description, reference being had to the accompanying drawing wherein a preferred embodiment of one form of the present invention is clearly shown.

Figure 1:
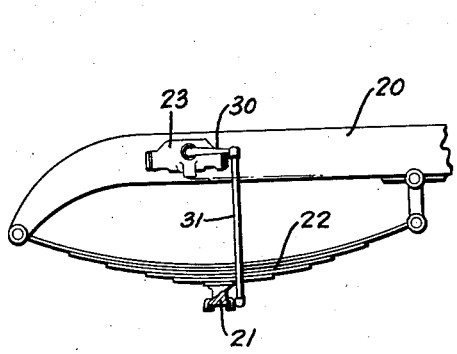
Fig. 1 is a fragmentary side view of a vehicle chassis having a shock absorber embodying the present invention attached thereto.

Referring to the drawing, the numeral 20 designates the frame of the vehicle, which is supported upon the vehicle axle 21 by springs 22. The shock absorber comprising a casing 23 is attached to the frame 20 of the vehicle as shown in Fig. 1.

Figure 2:
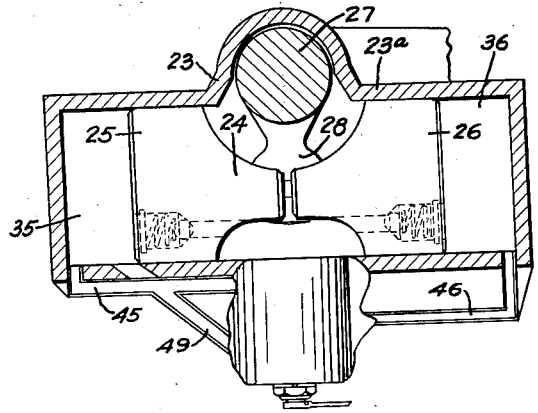
Fig. 2 is a diagrammatic view of the hydraulic shock absorber showing the fluid flow passages leading from the compression chambers to the fluid flow control device.

The casing 23 of the shock absorber provides a cylinder 23a in which a piston 24 is reciprocably carried, said piston having piston head portions 25 and 26 as shown in Fig. 2. A rocker shaft 27, journaled in the casing, has a rocker arm 28 provided thereon which is interposed between the piston head portions 25 and 26 so that oscillations of the arm 28 will move the piston 24 back and forth in the cylinder of the casing 23.

One end of the rocker shaft 27 extends outside the casing and has the shock absorber operating arm 30 provided thereon, the free end of said arm being swivelly secured to one end of a link 31, the opposite end of said link being attached to the axle 21 in any suitable manner.

The cylinder head portion 25 forms the spring rebound control chamber 35 in the casing 23, while piston head portion 26 forms the spring compression control chamber 36 in the shock absorber casing.

Figure 3:
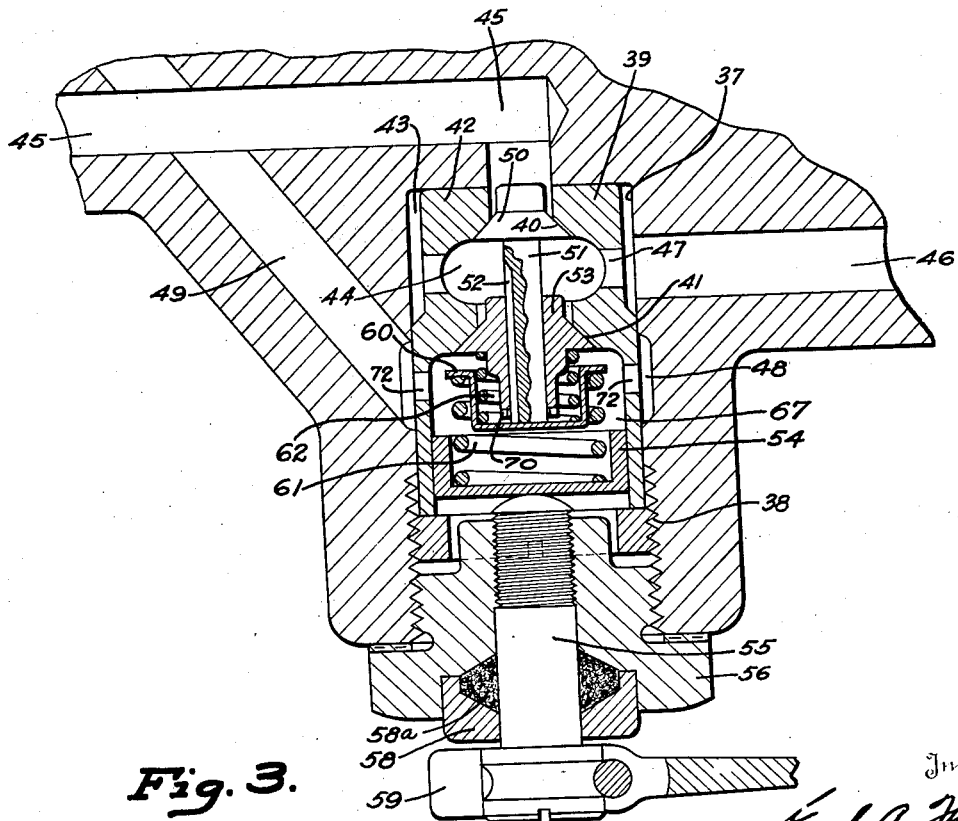
Fig. 3 is an enlarged fragmentary sectional view of the fluid flow control device of the shock absorber.

As shown in Fig. 3, the casing 23 is provided with a recess 37, the outer end of which is interiorly threaded as at 38. In this recess there is fitted a hollow valve block 39, said valve-block providing valve seats 40 and 41. The inner portion 42 of the valve block is of lesser diameter than the recess 37, thereby providing an annular space 43 between the block and the wall of the recess, which annular space is in communication with an interior chamber 44 in the block which is between the valve-seats 40 and 41 as shown in the Fig. 3. This inner chamber 44 communicates with duct 45 in the casing through the port having the valve-seat 40, said duct 45 in the casing leading to the spring rebound control chamber 35. This inner chamber 44 in the valve block 42 is also in communication with the duct 46 through a side passage 47 in the block, this duct 46 leading from the spring compression control chamber 36 in the shock absorber cylinder. The inner chamber formed by recess 67 in block 42 is in communication with the inner chamber 44 through the port having the valve-seat 41. This recess 67 is also in communication with an annular groove 48 in the recess 37 of the casing, this annular groove 48 being in communication with duct 49 which leads into the duct 45 as shown in Figs. 2 and 3. The annular groove 48 is not in direct communication with the annular space 43.

A valve 50 having a stem 51 is adapted to seat upon the valve-seat 40 to shut off communication between the duct 45 and the inner chamber 44 of the valve block 42. As shown in Fig. 3, the stem 51 of the valve 50 has a longitudinal groove 52 extending from the end of the stem into close proximity with the valve 50, for purposes to be described. A tubular shaped valve, 53 adapted to seat upon the valve seat 41, slidably supports the valve stem 51 of valve 50.

In the recess portion 67, of the valve block 42, there is slidably supported a piston 54 which normally rests against the end of the screw shaft 55, threadedly supported in the cap 56 as shown in Fig. 3. This cap 56 is threadedly received by the interiorly threaded portion 38 of the recess 37 of the casing 23. A plug 58 is provided in the cap 56 to press a packing 58a about the screw shaft 55 to prevent fluid leaks at this point. An actuator lever 59 is secured to the end of the shaft 55 extending outside the shock absorber for purposes of rotating the shaft 55 so that its screw threads may shift the said shaft inwardly or outwardly relatively to the cap 56 in response to rotation of the actuating lever 59. An abutment member 60 engages the end of the valve stem 51, a spring 61 being interposed between said abutment member 60 and the piston 54 to urge said member 60 against the valve stem 51.

From this it may be seen that spring 61 yieldably urges the valve 50 against its seat 40 by pushing the abutment member 60 against the end of the valve-stem 51 of said valve 50. Another spring 62 is interposed between the abutment member 60 and the tubular valve 53, said spring 62 yieldably maintaining the valve 53 upon its valve-seat 41 to shut off communication between the duct 46 and duct 49. As will be seen in Fig. 3, the end of the tubular valve 53 adjacent the abutment member 60, has notches 70 provided thereon so that at no time will communication between the longitudinal groove 52, in valve stem 51, and the chamber 67, within the valve block 42, be cut off by the movement of the valve 53 downwardly so that its lower edge will engage the abutment member 60. If such engagement is effected, the notches 70 in the end of the tubular valve 53 always maintain communication between the duct 52 and the chamber 67, which chamber, as has been mentioned before, is inside the valve block 42 between the valve 53 and the piston 54.

In response to compression movement of the springs 22 upwardly toward the frame 20, the piston 24 is moved toward the right as regards Fig. 2 and thus pressure is exerted upon the fluid within the compression chamber 36, said fluid being forced outwardly through duct 48. From duct 46 the fluid will enter the annular space 43 and thence through cross passage 47 into the inner chamber 44 of the valve-block 42, thence the fluid will flow through the longitudinal groove 52 in the valve-stem 51, enter the space 67 and exit through the transverse openings 72 in the valve-block, entering the annular groove 48 from whence the fluid will flow through the ducts 49 and 45 into the rebound control chamber 35. If the fluid pressure is so high that it cannot properly be relieved by the flow through the orifice presented between the longitudinal groove 52 and the annular valve 53, then this excessive fluid pressure will move the valve 53 from its seat against the effect of spring 62, thus there will be established another flow of fluid from the inner chamber 44 around valve 53 into the chamber 67, thence through side openings 72, into the annular groove 48 and through ducts 49 and 45 into the rebound control chamber 35, to relieve the excessive pressure in the compression control chamber 36.

The return movement 22 of the springs toward the normal position, which return movement is termed the rebound movement, results in a reverse movement of the piston 24, or more specifically a movement of the piston 24 toward the left as regards Fig. 2. Pressure will now be exerted on the fluid in chamber 35, forcing it through the ducts 45 and 49, side openings 72 in the chamber 67 and thence through the orifice provided by the longitudinal groove 52 and the valve 53 into the inner chamber 44, outwardly through passage 47 into duct 46, and thence into the compression control chamber 36. When the duct or longitudinal groove 52 cannot properly relieve the fluid pressure, then the valve 50 will be moved from its seat against the effect of spring 61 whereby a flow will be established from the duct 45 past the valve 50 into the inner chamber 44, thence through the cross passages 47 into the duct 46 and into the chamber 36.

If the operator finds that the shock absorber is not properly resisting the rebounding movement of the vehicle springs, that is, if the shock absorbers in response to the vehicle being driven over a comparatively rough road act too freely, then through any suitable connection accessible from the seat of the driver the lever 59 of the shock absorbers may be operated to turn the shaft 55 so that piston 54 is moved toward the valve 53, thereby increasing the tension or pressure of spring 61 upon the valve stem 51, which consequently increases the pressure of the valve 50 against its seat. Under these conditions the shock absorber would require a greater fluid pressure to establish a fluid flow between the rebound control chamber 35 and the compression chamber 36 and thus a greater control for such rebounding movements will be obtained.

On the other hand, if the shock absorbers are providing too stiff a ride, that is, if they are too greatly resisting spring or body movements, then the levers 59 are operated to rotate shaft 55 so that the piston 54 may be moved a greater distance from the valve 53, thereby to reduce the tension or pressure of spring 61 upon the valve stem 51.

By the operation of the adjusting lever 59 in one direction the tension of the spring 61 is increased, thereby increasing the pressure necessary from the spring rebound control chamber to operate valve 50 to establish its flow of fluid. This increasing of the tension of the spring 61 also affects the fluid flow control device of the spring compression control chamber inasmuch as after the valve 53 has been moved a predetermined distance, it will engage the abutment member 60, and therefore any other fluid pressure tending to move the valve 53 an additional distance must necessarily overcome the tension of spring 61. In no case, however, will the increase of the tension of spring 61 by the operation of the screw shaft 55 increase the tension of spring 62 for the abutment member 60, engaged by one end of spring 61, engages also the valve stem 51 whereby the valve 50 is moved against the seat 40, the spring 62 being interposed between the abutment member 60 and the valve 53.

Applicant in the present invention has provided a shock absorber having a fluid flow control device which is adjustable from outside the shock absorber whereby the shock absorber may be adjusted in accordance with the nature of the road over which the vehicle is being operated. If the road is comparatively rough and the shock absorbers do not offer sufficient resistance properly to control body and axle movements, then the lever 59 must be operated to increase the tension of spring 61 and thereby force valve 50 upon its seat 40 with a greater pressure, consequently requiring a greater fluid pressure to move it from its seat. This, of course, offers greater control by the shock absorber, thereby substantially reducing relative movements between the vehicle body and axles.

What is claimed is as follows:

1. A shock absorber comprising, in combination a casing having fluid pressure chambers; means for circulating fluid under pressure between said chambers; means for controlling said fluid circulation comprising two valves; one of which is tubular and slidably supports the stem of the other valve; an abutment member engaging the end of the said valve stem; a spring engaging said abutment member to urge its valve into closed position; a second spring interposed between the abutment member and the tubular valve to urge the latter into closed position; and a manually operated actuator for varying the tension of the first mentioned spring only.

2. A shock absorber comprising, in combination a casing having fluid pressure chambers; means for circulating fluid under pressure between said chambers; means for controlling said fluid circulation comprising two valves; one of which is tubular and slidably supports the stem of the second valve; a longitudinal groove in the stem of said second valve providing a constantly restricted fluid passage through the tubular valve; an abutment member; a spring urging said abutment member against the stem of the second valve and said valve into engagement with its seat, a second spring seated upon the abutment member and engaging the tubular valve, yieldably urging it upon its seat; a movable piston supporting the first mentioned spring; and a manually operated actuator for the piston, accessible from outside the shock absorber, for varying the tension of the spring supported by the piston.

3. In a shock absorber having two fluid displacement chambers and ducts connecting said chambers, the combination with telescopically engaging fluid flow control devices adapted to establish fluid flows through said ducts in opposite directions; of an abutment member engaging one of said devices; a spring resting upon said abutment member and engaging the other of said devices yieldably to urge it into duct closing position; a movable abutment member; a spring supported by said movable abutment member and engaging the other abutment member; and an actuator accessible from outside the shock absorber for moving the movable abutment member to vary the compression of the spring engaging it.

4. In a shock absorber having two fluid displacement chambers and ducts connecting said chambers, the combination with two valves adapted to be moved in the same direction to establish opposite flows through said ducts respectively; of a movable abutment member; a spring supported by said abutment member and adapted to urge the one valve into duct closing position; another spring supported by the first spring and engaging the other valve to urge it into duct closing position; and an actuator accessible from outside the shock absorber and engaging the movable abutment for opening it to vary the compression of the spring engaging it.

EARL A. THOMPSON.